United States Patent
Meagher

(10) Patent No.: US 7,510,613 B2
(45) Date of Patent: Mar. 31, 2009

(54) COMPOSITION AND PROCESS FOR TREATING METALS

(75) Inventor: Kevin K. Meagher, Northville, MI (US)

(73) Assignee: Henkel AG & Co. KGaA (DE)

( * ) Notice: Subject to any disclaimer, the term of this patent is extended or adjusted under 35 U.S.C. 154(b) by 625 days.

(21) Appl. No.: 10/380,898

(22) PCT Filed: Sep. 24, 2001

(86) PCT No.: PCT/US01/29921

§ 371 (c)(1),
(2), (4) Date: May 30, 2003

(87) PCT Pub. No.: WO02/24975

PCT Pub. Date: Mar. 28, 2002

(65) Prior Publication Data

US 2003/0188807 A1    Oct. 9, 2003

Related U.S. Application Data

(60) Provisional application No. 60/234,710, filed on Sep. 22, 2000.

(51) Int. Cl.
*C23C 22/07* (2006.01)
*C23C 22/36* (2006.01)
*C23C 22/50* (2006.01)
*C23C 22/53* (2006.01)

(52) U.S. Cl. .............. 148/259; 148/253; 148/274; 106/14.05; 106/14.12; 106/14.41; 106/14.44; 428/432

(58) Field of Classification Search ............... 148/240, 148/247–250; 106/14.12; 427/327
See application file for complete search history.

(56) References Cited

U.S. PATENT DOCUMENTS

| | | |
|---|---|---|
| 4,101,441 A | 7/1978 | Hwa et al. |
| 5,294,371 A | 3/1994 | Clubley et al. |
| 5,427,632 A | 6/1995 | Dolan |
| 5,885,373 A | 3/1999 | Sienkowski |
| 5,891,952 A | 4/1999 | McCormick et al. |
| 5,942,052 A | 8/1999 | Kamimura et al. |

*Primary Examiner*—Roy King
*Assistant Examiner*—Lois L Zheng
(74) *Attorney, Agent, or Firm*—Mary K. Cameron

(57) ABSTRACT

Metal surfaces are treated with acidic aqueous compositions to form conversion coatings. The acidic aqueous compositions contain fluorometallate anions, divalent and/or trivalent cations of certain elements such as zinc, phosphorus-containing inorganic oxyanions, phosphonate anions containing phosphorus atoms directly bonded to carbon atoms, and water-soluble and/or water-dispersible organic polymers and/or polymer-forming resins.

17 Claims, No Drawings

COMPOSITION AND PROCESS FOR TREATING METALS

This application is the National Stage of International Application No. PCT/US01/29921, filed 24 Sep. 2001, and published in English, from which priority is hereby claimed, as well as from U.S. Provisional Application Ser. No. 60/234,710, filed 22 Sep. 2000, which is the priority document for International Application No. PCT/US01/29921.

BACKGROUND OF THE INVENTION

This invention relates to compositions and processes for treating metal surfaces with acidic aqueous compositions to form conversion coatings on the metals; the conversion coatings provide excellent bases for subsequent painting. The invention is well suited to treating iron and steel, galvanized iron and steel, zinc and those of its alloys that contain at least 50 atomic percent zinc, and aluminum and its alloys that contain at least 50 atomic percent aluminum. Preferably the surface treated is predominantly zinciferous; most preferably the surface treated is galvanized steel.

U.S. Pat. No. 5,427,632 of Jun. 27, 1995 to Dolan (hereinafter usually denoted as "the '632 patent") teaches that effective coatings of this type can be formed by treatment with aqueous acid compositions that comprise water and:

(A) a component of fluorometallate anions, each of said anions consisting of (i) at least four fluorine atoms, (ii) at least one atom of an element selected from the group consisting of titanium, zirconium, hafnium, silicon, aluminum, and boron, and, optionally, (iii) ionizable hydrogen atoms, and, optionally, (iv) one or more oxygen atoms;

(B) a component of divalent or tetravalent cations of elements selected from the group consisting of cobalt, magnesium, manganese, zinc, nickel, tin, copper, zirconium, iron, and strontium;

(C) a component of phosphorus-containing inorganic oxyanions and/or phosphonate anions;

(D) a component of water-soluble and/or -dispersible organic polymers and/or polymer-forming resins; and (E) acidity; and, optionally, one or both of the following components (F) a dissolved oxidizing agent, preferably a peroxy compound, more preferably hydrogen peroxide; and, optionally, (G) a component selected from dissolved or dispersed complexes stabilized against settling, said complexes resulting from reaction between (i) substances that, before reaction, could be part of component (A) and (ii) one or more materials selected from the group consisting of metallic and metalloid elements and the oxides, hydroxides, and carbonates of these metallic or metalloid elements, to produce a reaction product other than any which could be part of component (B).

In the working examples of the '632 patent, only inorganic phosphates were used as component (C). Compositions of this type have enjoyed considerable commercial success, especially on predominantly ferriferous surfaces. However, it has recently been found that when compositions according to the most preferred examples of the '632 patent are used on predominantly zinciferous surfaces and the conversion coating formed thereby is subsequently painted, the adhesion of the paint to the coating after subsequent bending is sometimes less than is desired. Accordingly, one object of this invention is to provide compositions and processes that maintain the benefits of those taught in the '632 patent, particularly avoiding any substantial use of hexavalent chromium and other materials such as ferricyanide that have been identified as environmentally damaging, while increasing the paint adhesion to the coating in regions subjected to bending. Other alternative and/or concurrent objects will become apparent from the description below.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred, however. Also, unless expressly stated to the contrary: percent, "parts of", and ratio values are by weight; the term "polymer" includes "oligomer", "homopolymer", "terpolymer", and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description and/or as produced by reaction in situ by reactions noted in the description, and does not necessarily preclude chemical interactions among the constituents of a mixture once mixed; specification of materials in ionic form implies the presence of sufficient counterions to produce electrical neutrality for the composition as a whole (any counterions thus implicitly specified should preferably be selected from among other constituents explicitly specified in ionic form, to the extent possible; otherwise such counterions may be freely selected, except for avoiding counterions that act adversely to the objects of the invention); the term "paint" and its grammatical variations includes all more specialized terms such as "lacquer", "varnish", "shellac", "enamel", "vitreous enamel", "self-crosslinking protective coatings", "coating resins", "primer", "top coat", "color coat", etc; and the term "mole" and its grammatical variations means "gram mole" and its corresponding grammatical variations and may be applied to elemental, ionic, hypothetical, unstable, and any other chemical species defined by the number and type of atoms present in the species, as well as to compounds with well defined molecules.

BRIEF SUMMARY OF THE INVENTION

It has been found that the major object of the invention as stated above can be achieved by using a mixture of both inorganic phosphates and organic phosphonates as component (C) as described above, provided that the ratio of the concentration of moles of phosphorus atoms directly bound to carbon atoms in the organic phosphonates to the number of moles of phosphorus atoms in the inorganic phosphates in the same composition is within a range from 0.05:1.0 to 5:1.0. In some preferred embodiments, other changes from the most preferred teachings of the '632 patent are also made. In a process according to the invention, the treatment composition as described above and in more detail below is coated in a substantially uniform layer over the metal surface to be treated and then dried into place on the surface of the metal, without intermediate rinsing. Various embodiments of the invention include working compositions for direct use in treating metals, concentrates from which such working compositions can be prepared by dilution with water, processes for treating metals with a composition according to the invention, and extended processes including additional steps that are conventional per se, such as precleaning, rinsing, and, particularly advantageously, painting or some similar overcoating process that puts into place an organic binder containing protective coating over the conversion coating formed according to a narrower embodiment of the invention. Articles of manufacture including surfaces treated according to a process of the invention are also within the scope of the invention.

DETAILED DESCRIPTION OF THE INVENTION AND PREFERRED EMBODIMENTS

A composition according to the invention comprises, preferably consists essentially of, or more preferably consists of, water and:

(A) a component of dissolved fluorometallate anions, each of said anions comprising (i) at least four fluorine atoms and (ii) at least one atom of an element selected from the group consisting of titanium, zirconium, hafnium, silicon, aluminum, and boron (the fluorometallate anions may optionally contain other atoms such as, for example, (iii) ionizable hydrogen atoms and/or (iv) one or more oxygen atoms); preferably the anions are hexafluorotitanate (i.e., $TiF_6^{-2}$) or hexafluorozirconate (i.e., $ZrF_6^{-2}$), most preferably hexafluorotitanate;

(B) a component of dissolved divalent or tetravalent cations of elements selected from the group consisting of cobalt, magnesium, manganese, zinc, nickel, tin, copper, zirconium, iron, and strontium; preferably at least, with increasing preference in the order given, 60, 70, 80, 85, 90, or 95% of the total of component (B) is selected from the group consisting of zinc, cobalt, nickel, and manganese, more preferably of zinc, manganese, and nickel, still more preferably of zinc and manganese, or most preferably of zinc alone; independently, with increasing preference in the order given, the ratio of the total number of cations of component (B) to the number of anions in component (A) in the said composition is at least 0.2:1.00, 0.4:1.00, 0.60: 1.00, 0.70:1.00, 0.80:1.00, 0.90:1.00, 0.95:1.00, 1.00:1.00, 1.05:1.00, 1.10:1.00, or 1.15:1.00; and independently preferably is not more than, with increasing preference in the order given, not greater than 5.0:1.00, 4.0:1.00, 3.0:1.00, 2.5:1.00, 2.3:1.00, 2.1:1.00, 1.9:1.00, 1.7:1.00, 1.60:1.00, 1.50:1.00, 1.40:1.00, 1.35:1.00, 1.30:1.00, 1.25:1.00, 1.20:1.00, or 1.18:1.00;

(C.1) a component of inorganic oxyanions containing phosphorus in its pentavalent state; the number of moles of this component, measured as its stoichiometric equivalent as $H_3PO_4$, the stoichiometry being based on equivalent numbers of phosphorus atoms, preferably has a ratio to the number of anions of component (A) as described above in said composition that is at least, with increasing preference in the order given, 0.2:1.00, 0.4:1.00, 0.6:1.00, 0.80:1.00, 0.90:1.00, 1.00:1.00, 1.10:1.00, 1.15:1.00, 1.20:1.00, 1.25:1.00, 1.30:1.00, 1.35:1.00, 1.40:1.00, or 1.42:1.00 and independently preferably is not more than, with increasing preference in the order given, 7.0:1.00, 6.0:1.00, 5.0:1.00, 4.0:1.00, 3.0:1.00, 2.5:1.00, 2.2:1.00, 1.9:1.00, 1.80:1.00, 1.75:1.00, 1.70:1.00, 1.65:1.00, 1.60:1.00, 1.55:1.00, 1.50:1.00, or 1.45:1.00;

(C.2) a component of dissolved phosphonate anions; the number of phosphorus atoms bonded directly to carbon in said dissolved phosphonate anions preferably has a ratio to the number of anions of component (A) in said composition as described above that is at least, with increasing preference in the order given, 0.05:1.00, 0.09:1.00, 0.12:1.00, 0.15:1.00, 0.18:1.00, 0.21:1.00, 0.24:1.00, 0.27:1.00, 0.30:1.00, 0.33:1.00, 0.35:1.00, 0.37:1.00, or 0.39:1.00 and independently preferably is not more than, with increasing preference in the order given, 5.0:1.00, 3.0:1.00, 2.0:1.00, 1.50:1.00, 1.30:1.00, 1.20:1.00, 1.10:1.00, 1.05:1.00, 1.00:1.00, 0.96:1.00, 0.92:1.00, 0.88:1.00, 0.85:1.00, 0.83:1.00, 0.81:1.00, or 0.79:1.00;

(D) a component of water-soluble and/or -dispersible organic polymers and/or polymer-forming resins, preferably in an amount such that the ratio of the non-volatiles content of the organic polymers and polymer-forming resins in the composition to the content of component (A) is at least, with increasing preference in the order given, 0.2:1.00, 0.4:1.00, 0.6:1.00, 0.80:1.00, 0.90:1.00, 0.95:1.00, 1.00:1.00, 1.05:1.00, 1.07:1.00, or 1.09:1.00 and independently preferably is not more than, with increasing preference in the order given, 6.0:1.00, 5.0:1.00, 4.0:1.00, 3.0:1.00, 2.5:1.00, 2.2:1.00, 1.9:1.00, 1.80:1.00, 1.70:1.00, 1.60:1.00, 1.55:1.00, 1.50:1.00, 1.45:1.00, 1.40:1.00, 1.35:1.00, 1.30:1.00, 1.25:1.00, 1.20:1.00, 1.15:1.00, 1.12:1.00, or 1.10:1.00; and (E) acidity, preferably in sufficient amount to give a working composition a pH that is at least, with increasing preference in the order given, 0.5, 1.0, 1.7, or 2.0 and independently preferably is not more than, with increasing preference in the order given, 5.0, 4.5, 4.0, or 3.5.

One or more additional components may also be present. In especially preferred embodiments of the invention, the composition contains one or both of the following components:

(F) a dissolved oxidizing agent, preferably a peroxy compound, more preferably hydrogen peroxide; and/or (G) a component selected from dissolved or dispersed complexes stabilized against settling, said complexes resulting from reaction between (i) substances that, before reaction, could be part of component (A) and (ii) one or more materials selected from the group consisting of metallic and metalloid elements and the oxides, hydroxides, and carbonates of these metallic or metalloid elements, to produce a reaction product other than any which could be part of component (B).

Component (C.1) as defined above is to be understood as including all of the following inorganic acids and their salts that may be present in the composition: metaphosphoric acid $(HPO_3)_y$, orthophosphoric acid $(H_3PO_4)$, pyrophosphoric acid $(H_4P_2O_7)$, orthophosphoric acid $(H_3PO_4)$, tripolyphosphoric acid $(H_5P_3O_{10})$, and further condensed phosphoric acids having the formula $H_{x+2}P_xO_{3x+1}$, where x is a positive integer greater than 3. Generally, orthophosphoric acid and/or orthophosphates are preferred as sources for component (C.1) because they are more economical, and the condensed acids and anions tend to hydrolyze to orthophosphoric acid and orthophosphates with time under conditions of use according to the invention.

Component (C.2) is preferably sourced to a composition according to the invention by any sufficiently water-soluble phosphonic acid or salt thereof (particularly the sodium and potassium salts), among which those commercially available are preferred at least for economy. Preferably, the phosphonic acid contains two or more phosphonic acid functional groups per molecule. Preferably, if two phosphonic acid functional groups are present in a single molecule, such groups are separated by one to three carbon atoms. Preferably, the phosphonic acid contains at least one hydroxy group directly substituted on a carbon atom. 1-Hydroxyethylidene-1,1-diphosphonic acid is particularly preferred, because compositions containing it appear to be less susceptible to formation of a separate phase in dilute working compositions than otherwise similar compositions formulated with the other phosphonic acids tested so far. Other phosphonic acids which may be suitable for use in the present invention, in either their free acid or salt form, include aminotri(methylenephosphonic acid), nitrilotris(methylene) triphosphonic acid, ethylenediaminetetra(methylenephosphonic acid), and diethylenetriamine penta(methylenephosphonic acid). Many of the aforementioned phosphonic acids and phosphonic acid salts are available from commercial sources, including, for example, the phosphonates sold by Solutia under the trademark DEQUEST.

Independently of other preferences, the ratio of the number of moles of phosphorus atoms bonded directly to carbon in component (C.2) of a composition according to this invention preferably has a ratio to the number of moles of phosphorus atoms in component (C.1) in the same composition that is at least, 0.080:1.00, 0.090:1.00, 0.10:1.00, 0.13:1.00, 0.16:1.00, 0.18:1.00, 0.20:1.00, 0.22:1.00, 0.24:1.00, or 0.26:1.00 and independently preferably is not more than, with increasing preference in the order given, 0.90:1.00, 0.80:1.00, 0.75:1.00, 0.70:1.00, 0.66:1.00, 0.63:1.00, 0.60:1.00, 0.57:1.00, or 0.55: 1.0.

Component (D) is preferably selected from the group consisting of epoxy resins, aminoplast (i.e., melamine-formaldehyde and urea-formaldehyde) resins, tannins, phenol-formaldehyde resins, and polymers of vinyl phenol with sufficient amounts of alkyl- and substituted alkyl-aminomethyl substituents on the phenolic rings to render the polymer water soluble or dispersible. More preferably, component (D) is selected from epoxy resins and/or, most preferably only from, polymers and/or copolymers of one or more y-(N—$R^1$—N—$R^2$-aminomethyl)-4-hydroxy-styrenes, where y=2, 3, 5, or 6, $R^1$ represents an alkyl group containing from 1 to 4 carbon atoms, preferably a methyl group, and $R^2$ represents a substituent group conforming to the general formula H(CHOH)$_n$CH$_2$—, where n is an integer from 1 to 7, preferably from 3 to 5. The average molecular weight of these polymers preferably is within the range from 700 to 70,000, or more preferably from 3,000 to 20,000.

Component (D) may also be selected from addition polymers of unsaturated carboxylic acid monomers and derivatives thereof (e.g., esters). Exemplary monomers include acrylic acid, methacrylic acid, and esters of acrylic acid and methacrylic acid (e.g., esters of acrylic and methacrylic acid with aliphatic alcohols containing one to six carbon atoms). Methyl methacrylate, butyl acrylate, ethyl acrylate, and hydroxyethyl acrylate are examples of suitable esters. Homopolymers as well as copolymers of such monomers may be used; the unsaturated carboxylic acids and esters thereof may be copolymerized with other types of monomers such as, for example, styrene.

It should be understood that the components listed need not necessarily all be provided by separate chemicals. For example, it is preferred that the fluorometallate anions and phosphorous containing anions both be added in the form of the corresponding acids, thereby also providing some, and usually all, of the required acidity for component (E). Also, if the acidity of the composition is sufficiently high and the substrate that is contacted with it is predominantly ferrous, component (B) can be provided by iron dissolved from the substrate and need not be present in the liquid composition when the liquid composition is first contacted with the substrate.

For a variety of reasons, it is preferred that compositions according to the invention as defined above should be substantially free from many ingredients used in compositions for similar purposes in the prior art. Specifically, it is increasingly preferred in the order given, independently for each preferably minimized component listed below, that these compositions, when directly contacted with metal in a process according to this invention, contain no more than 1.0, 0.35, 0.10, 0.08, 0.04, 0.02, 0.01, 0.001, or 0.0002, percent of each of the following constituents: hexavalent chromium; ferricyanide; ferrocyanide; sulfates and sulfuric acid; anions containing molybdenum or tungsten; alkali metal and ammonium cations; pyrazole compounds; sugars; gluconic acid and its salts; glycerine; α-glucoheptanoic acid and its salts; and myoinositol phosphate esters and salts thereof.

Furthermore, in a process according to the invention that includes other steps than the drying into place on the surface of the metal of a layer of a composition as described above, it is preferred that none of these other steps include contacting the surfaces with any composition that contains more than, with increasing preference in the order given, 1.0, 0.35, 0.10, 0.08, 0.04, 0.02, 0.01, 0.003, 0.001, or 0.0002% of hexavalent chromium, except that a final protective coating system including an organic binder, more particularly those including a primer coat, may include hexavalent chromium as a constituent. Any such hexavalent chromium in the protective coating is generally adequately confined by the organic binder, so as to avoid adverse environmental impact.

In one embodiment of the invention, it is preferred that the acidic aqueous composition as noted above be applied to the metal surface and dried thereon within a short time interval. With increasing preference in the order given, the time interval during which the liquid coating is applied to the metal being treated and dried in place thereon, when heat is used to accelerate the process, is not more than 25, 15, 9, 7, 4, 3, 1.8, 1.0, or 0.7 second (hereinafter often abbreviated "sec"). In order to facilitate this rapid completion of a process according to this invention, it is often preferred to apply the acidic aqueous composition used in the invention to a warm metal surface, such as one rinsed with hot water after initial cleaning and very shortly before treating with the aqueous composition according to this invention, and/or to use infrared or microwave radiant heating and/or convection heating in order to effect very fast drying of the applied coating. In such an operation, a peak metal temperature that is at least, with increasing preference in the order given, 30, 40, 50, 55, 57, 59, 62, 63, or 65° C. and independently preferably is not more than, with increasing preference in the order given, 90, 80, 75, 72, 70, 68, or 66° C., would normally be preferred. These temperatures might need to be varied to suit the tolerances of particular types of paints.

In an alternative embodiment, which is equally effective technically and is satisfactory when ample time is available at acceptable economic cost, a composition according to this invention may be applied to the metal substrate and allowed to dry at a temperature not exceeding 40° C. In such a case, there is no particular advantage to fast drying.

The effectiveness of a treatment according to the invention appears to depend predominantly on the total amounts of the active ingredients that are dried in place on each unit area of the treated surface, and on the nature and ratios of the active ingredients to one another, rather than on the concentration of the acidic aqueous composition used. Thus, if the surface to be coated is a continuous flat sheet or coil and precisely controllable coating techniques such as roll coaters are used, a relatively small volume per unit area of a concentrated composition may effectively be used for direct application. On the other hand, with some coating equipment, it is equally effective to use a more dilute acidic aqueous composition to apply a heavier liquid coating that contains about the same amount of active ingredients. As a general guide, it is normally preferable for the working composition to have a concentration of:

at least, with increasing preference in the order given, 0.010, 0.020, 0.023, 0.026, or 0.028 moles of component (A) per kilogram of total composition (hereinafter "M/kg");

at least, with increasing preference in the order given, 0.010, 0.020, 0.024, 0.027, 0.030, or 0.033 M/kg of component (B);

at least, with increasing preference in the order given, 0.015, 0.030, 0.038, or 0.042 M/kg of component (C.1) measured as its stoichiometric equivalent as $H_3PO_4$;

at least, with increasing preference in the order given, 0.001, 0.003, 0.005, 0.0070, 0.0080, 0.0090, 0.0100, or 0.0110 M/kg of phosphorus atoms bonded directly to carbon from component (C.2); and at least, with increasing preference in the order given, 0.10, 0.20, 0.30, 0.35, 0.40, 0.45, 0.48, or 0.50% of the total working composition to be non-volatiles from component (D).

Working compositions containing up to from two to ten times and preferably five to ten times these amounts of active ingredients are also generally fully practical to use, particularly when coating control is precise enough to meter relatively thin uniform films of working composition onto the metal surface to be treated according to the invention. A concentrate composition that contains from about two to twenty and preferably at least ten times these amounts of active ingredients is preferably used as a source of the active ingredients for a more dilute working composition, in order to reduce the costs of shipping water that can be more economically added to make the working composition where it is used.

If used, component (F) preferably is present in a working composition according to this invention in an amount to provide a concentration of oxidizing equivalents per liter of composition that is equal to that of a composition containing from 0.5 to 15, or more preferably from 1.0 to 9.0, % of hydrogen peroxide. (The term "oxidizing equivalent" as used herein is to be understood as equal to the number of grams of oxidizing agent divided by the equivalent weight in grams of the oxidizing agent. The equivalent weight of the oxidizing agent is the gram molecular weight of the agent divided by the change in valency of all atoms in the molecule which change valence when the molecule acts as an oxidizing agent; usually, this is only one element, such as oxygen in hydrogen peroxide.) Ordinarily component (F) is not needed and is therefore preferably omitted for economy.

The term "stabilized against settling" in the description of component (G) above means that the composition containing the material does not suffer any visually detectable settling or separation into distinct liquid phases when stored for a period of 100, or more preferably 1000, hours at 25° C. Materials for component (G) may be prepared by adding one or more metallic and/or metalloid elements or their oxides, hydroxides, and/or carbonates to an aqueous composition containing at least one material that before reaction could be part of component (A). A spontaneous chemical reaction normally ensues, converting the added element, oxide, hydroxide, or carbonate into a soluble species. The reaction to form this soluble species can be accelerated by use of heat and stirring or other agitation of the composition. The formation of the soluble species is also aided by the presence in the composition of suitable complexing ligands, such as peroxide and fluoride. Preferably the amount of component (G) when used in a concentrate composition is not greater than that formed by addition, with increasing preference in the order given, of up to 50, 20, 12, 8, 5, or 4 parts per thousand, based on the ultimate total mass of the concentrate composition, of the metallic or metalloid element or its stoichiometric equivalent in an oxide, hydroxide, or carbonate, to the concentrate composition. Independently, the amount of component (G) when used in a concentrate composition preferably is at least as great as that formed by addition, with increasing preference in the order given, of at least 0.1, 0.20, 0.50, or 1.0 parts per thousand, based on the ultimate total mass of the concentrate composition, of the metallic or metalloid element or its stoichiometric equivalent in an oxide, hydroxide, or carbonate, to the concentrate composition. However, in most instances, component (G) is not needed to obtain satisfactory results and is therefore preferably omitted for economy.

A working composition according to the invention may be applied to a metal workpiece and dried thereon by any convenient method, several of which will be readily apparent to those skilled in the art. For example, coating the metal with a liquid film may be accomplished by immersing the surface in a container of the liquid composition, spraying the composition on the surface, coating the surface by passing it between upper and lower rollers with the lower roller immersed in a container of the liquid composition, and the like, or by a mixture of methods. Excessive amounts of the liquid composition that might otherwise remain on the surface prior to drying may be removed before drying by any convenient method, such as drainage under the influence of gravity, squeegees, passing between rolls, and the like. Drying also may be accomplished by any convenient method, such as a hot air oven, exposure to infra-red radiation, microwave heating, and the like.

For flat and particularly continuous flat workpieces such as sheet and coil stock, application by a roller set in any of several conventional arrangements, followed by drying in a separate stage, is generally preferred. The temperature during application of the liquid composition may be any temperature within the liquid range of the composition, although for convenience and economy in application by roller coating, normal room temperature, i.e., from 20-30° C., is usually preferred. In most cases for continuous processing of coils, rapid operation is favored, and in such cases drying by infrared radiative heating, to produce a peak metal temperature in the range already given above, is generally preferred.

Alternatively, particularly H the shape of the substrate is not suitable for roll coating, a composition may be sprayed onto the surface of the substrate and allowed to dry in place; such cycles can be repeated as often as needed until the desired thickness of coating, generally measured in milligrams per square meter (hereinafter "mg/m$^2$"), is achieved. For this type of operation, it is preferred that the temperature of the metal substrate surface during application of the working composition be in the range from 20 to 300, more preferably from 30 to 100, or still more preferably from 30 to 90° C.

Preferably the amount of composition applied in a process according to this invention is chosen so as to result in a total add-on mass (after drying) in the range from 5 to 500 mg/m$^2$, more preferably from 10 to 400 mg/m$^2$, or still more preferably from 50 to 300 mg/m$^2$, of surface treated. The add-on mass of the protective film formed by a process according to the invention may be conveniently monitored and controlled by measuring the add-on weight or mass of the metal atoms in the anions of component (A) as defined above. The amount of these metal atoms may be measured by any of several conventional analytical techniques known to those skilled in the art. The most reliable measurements generally involve dissolving the coating from a known area of coated substrate and determining the content of the metal of interest in the resulting solution. The total add-on mass can then be calculated from the known relationship between the amount of the metal in component (A) and the total mass of the part of the total composition that remains after drying. In practice, however, because it is more convenient and sufficiently accurate to control the quality of the results achieved, measurement of the add-on of the metal atoms of component (A) as described above in the coating is usually preferably accomplished by use of a portable X-ray emission spectrophotometer as known in the art.

Preferably, the metal surface to be treated according to the invention is first cleaned of any contaminants, particularly organic contaminants and foreign metal fines and/or inclusions. Such cleaning may be accomplished by methods known to those skilled in the art and adapted to the particular type of metal substrate to be treated. For example, for galvanized steel surfaces, the substrate is most preferably cleaned with a conventional hot alkaline cleaner, then rinsed with hot water, squeegeed, and dried. For aluminum, the surface to be treated most preferably is first contacted with a conventional hot alkaline cleaner, then rinsed in hot water, then, optionally, contacted with a neutralizing acid rinse, before being contacted with an acid aqueous composition as described above.

The invention is particularly well adapted to treating surfaces that are to be subsequently further protected by applying conventional organic protective coatings such as paint, lacquer, and the like over the surface produced by treatment according to the invention.

The practice of this invention may be further appreciated by consideration of the following, non-limiting, working examples, and the benefits of the invention may be further appreciated by reference to the comparison examples.

Preparation and Composition of Concentrates

The compositions of concentrates are given in Table 1. The polymer of substituted vinyl phenol used to supply component (D) in most of the examples was made substantially according to the directions of Example 7 of U.S. Pat. No. 5,891,952 of Apr. 6, 1999 to McCormick et al. The solution contained 8.4% of the solid polymer and 1.2% of $H_2TiF_6$, with the balance water except for 300 parts per million of residual formaldehyde. The polymer contained in this solution is identified below as "Aminomethyl substituted polyvinyl phenol". The concentrates were prepared generally by adding the inorganic acid ingredients to about half of the water ultimately required (exclusive of that contained in the sources of polymer and the other active ingredients), then adding the zinc oxide, which reacts with acid to form zinc cations in solution, allowing the resulting solution to cool, and finally adding the polymer, organic acid, and remaining water needed. Only Concentrate 2 is according to this invention; in Concentrate 1 the ratio of organic to inorganic phosphorus is too small and in Concentrate 3 the ratio of organic to inorganic phosphorus is too large.

TABLE 1

| Ingredient | Parts of Ingredient in Concentrate Composition Number: | | |
|---|---|---|---|
| | 1 | 2 | 3 |
| $H_2TiF_6$ (sourced as 60% solution in water) | 49 | 49 | 49 |
| $H_3PO_4$ (sourced as 75% solution in water | 43 | 43 | 43 |
| 1-hydroxyethylidene-1, 1-diphosphonic acid | 6 | 25 | 97 |
| Zinc cations (sourced as zinc oxide) | 23 | 23 | 23 |
| "Aminomethyl substituted polyvinyl phenol" | 53 | 53 | 53 |
| Deionized water | Balance to 1000 Parts Total | | |

Working Treatment Compositions, Process Conditions, and Test Method

Working compositions were made from the concentrates shown in Table 1 by diluting the concentrates with 9.0 times their own weight of deionized water. Test pieces of galvanized steel were subjected to the following sequence of process operations:

1. Spray cleaned for 10 seconds at 66° C. with an aqueous cleaner made from PARCO® CLEANER 1200 (commercially available from the Henkel Surface Technologies Division of Henkel Corp., Madison Heights, Mich., USA) according to its supplier's directions;
2. Rinsed with hot water;
3. Dried with forced air (optionally after using a squeegee);
4. Coated with a liquid layer of working composition as described above, using a drawdown bar and/or roll coater;
5. Dried in place in an infra-red radiative oven to a peak metal temperature of 66° C.;
6. Coated successively with Akzo Nobel epoxy primer 9X444 and then with Akzo Nobel topcoat KW3R25794 according to the manufacturer's directions, which include heating and then quenching after each coat was applied.

Three replicate samples were used for each working composition tested.

The coated samples were tested according to a standard T-Bend Test. Only Composition 2 yielded satisfactory results, with an average value of about 3T.

The mass per unit area of the coating was determined on some samples that were removed from the process sequence after the completion of operation 5 as described above. The median mass per unit area was about 60 mg/m².

What is claimed is:

1. An aqueous liquid composition for treating metal surfaces, optionally after dilution with water, said composition comprising water and:
   (A) at least about 0.010 M/kg of a component of fluorometallate anions, each of said anions comprising (i) at least four fluorine atoms, and (ii) at least one atom of an element selected from the group consisting of titanium, zirconium, hafnium, silicon, aluminum, and boron;
   (B) a component of divalent or tetravalent cations of elements selected from the group consisting of cobalt, magnesium, manganese, zinc, nickel, tin, copper, zirconium, iron, and strontium in such an amount that the ratio of the total number of cations of this component to the number of anions in component (A) is at least about 1:5 but not greater than about 3:1;
   (C.1) at least about 0.015 M/kg of phosphorus atoms in a component selected from the group consisting of pentavalent phosphorus-containing inorganic oxyanions in such an amount that the ratio of the total number of moles of this component to the number of moles of anions in component (A) is at least about 0.2:1 but not greater than about 7:1;
   (C.2) at least about 0.001 M/kg of phosphorus atoms bonded directly to carbon in phosphonate anions, the ratio of the concentration of moles of phosphorus atoms directly bound to carbon atoms in the organic phosphonates to the number of moles of phosphorus atoms in the inorganic phosphates in the same composition is at least 0.16:1.0 and is not more than 0.90:1.0 and said phosphorus atoms in phosphonate anions are present in such an amount that the ratio of the total number of moles of this component to the number of moles of anions in component (A) is within a range from about 0.05:1.0 to about 5:1.0;

(D) at least about 0.10% of non-volatile contents of a component selected from the group consisting of water-soluble and water-dispersible organic polymers and polymer-forming resins, the amount of component (D) also being such that the ratio of the solids content of the organic polymers and polymer-forming resins in the composition to the solids content of component (A) is within the range from about 1:2 to 3:1; and (E) acidity.

2. The aqueous liquid composition of claim 1, wherein the ratio of C.2/C1 is from about 0.16:1 to about 0.8:1.

3. The aqueous liquid composition of claim 1 wherein the ratio of the number of cations of component (B) to the number of anions of component (A) is from about 0.4:1 to about 2.3:1; and the ratio of 0.2/0.1 is from about 0.20:1 to about 0.80:1.

4. A concentrate which, when diluted from 1 to 15 times the weight of the concentrate with water, provides a composition of claim 1.

5. A concentrate which, when diluted with from 1 to 70 times the weight of the concentrate with water, provides a composition of claim 2.

6. A concentrate which, when diluted with from 1 to 20 times the weight of the concentrate with water, provides a composition of claim 3.

7. A process for treating a metal surface which comprises: (I) coating the metal surface with a coating of a liquid composition of claim 1 or a diluted solution thereof in water; and (II) drying into place on the surface of the metal the coating applied in step (I), without intermediate rinsing.

8. The process of claim 7 wherein the liquid composition of claim 2 or a diluted solution thereof in water is applied to the metal substrate.

9. The process of claim 7 wherein the liquid composition of claim 6 or a diluted solution thereof with water is applied to the metal substrate.

10. The process of claim 7 wherein the coating is dried at a peak temperature of the metal substrate of from 30° C. to 90°0 C.

11. The process of claim 7 wherein the peak metal temperature is from 40C. to 80° C.

12. The process of claim 7 wherein a weight of dried coating on the metal substrate is from 5 mg/m$^2$ to 500 mg/m$^2$.

13. The process of claim 12 wherein the weight of dried coating is from 50 mg/m$^2$ to 300 mg/m$^2$.

14. An article produced by the process of claim 7.

15. An article of manufacture comprising;

1.) a metal surface, said metal selected from the group consisting of galvanized iron, galvanized steel, zinc, zinc alloys that contain at least 50 atomic % zinc;

2.) a conversion coating on the metal surface, said coating providing a base for subsequent painting; and 3.) a paint applied to the conversion coating to form a painted metal surface; wherein the conversion coating is applied to the metal surface as an aqueous liquid composition, optionally after dilution with water, and then dried, said composition comprising water and:

(A) at least about 0.010 M/kg of a component of fluorometallate anions, each of said anions comprising (i) at least four fluorine atoms, and (ii) at least one atom of an element selected from the group consisting of titanium, zirconium, hafnium, silicon, aluminum, and boron;

(B) a component of divalent or tetravalent cations of elements selected from the group consisting of cobalt, magnesium, manganese, zinc, nickel, tin, copper, zirconium, iron, and strontium in such an amount that the ratio of the total number of cations of this component to the number of anions in component (A) is at least about 1:5 but not greater than about 3:1;

(C) phosphorus-containing substances comprising at least one inorganic phosphate and at least one organic phosphonate, said inorganic phosphate selected from the group consisting of pentavalent phosphorus-containing inorganic oxyanions, said organic phosphonate comprising phosphorus atoms bonded directly to carbon in phosphonate anions, and the ratio of the concentration of moles of phosphorus atoms directly bound to carbon atoms in the organic phosphonates to the number of moles of phosphorus atoms in the inorganic phosphates in the same composition being within a range from about 0.16:1.0 to about 0.9:1.0, and said phosphorus atoms directly bound to carbon atoms in the organic phosphonates are present in such an amount that the ratio of the total number of moles of phosphorus atoms directly bound to carbon atoms to the number of moles of anions in component (A) is within a range from about 0.05:1.0 to about 5:1.0;

(D) at least about 0.10% of non-volatile contents of a component selected from the group consisting of water-soluble and water-dispersible organic polymers and polymer-forming resins, the amount of component (D) also being such that the ratio of the solids content of the organic polymers and polymer-forming resins in the composition to the solids content of component (A) is within the range from about 1:2 to 3:1; and (E) acidity;

wherein paint remains adhered to said painted metal surface after bending.

16. An aqueous liquid composition for treating metal surfaces optionally after dilution with water, said composition comprising water and:

(A) at least about 0.010 M/kg to about 0.28 M/kg of a component of fluorometallate anions, each of said anions comprising (i) at least four fluorine atoms, and (ii) at least one atom of an element selected from the group consisting of titanium, zirconium, hafnium, silicon, aluminum, and boron;

(B) a component of divalent or tetravalent cations of elements selected from the group consisting of cobalt, magnesium, manganese, zinc, nickel, tin, copper, zirconium, iron, and strontium, wherein at least 60% of the total of component (B) is zinc, in such an amount that the ratio of the total number of cations of this component to the number of anions in component (A) is at least about 1:5 but not greater than about 3:1;

(C.1) at least about 0.015 M/kg of phosphorus atoms in a component selected from the group consisting of pentavalent phosphorus-containing inorganic oxyanions in such an amount that the ratio of the total number of moles of this component to the number of moles of anions in component (A) is at least about 0.2:1 but not greater than about 7:1;

(C.2) at least about 0.00 1 M/kg of phosphorus atoms bonded directly to carbon in phosphonate anions, the ratio of the concentration of moles of phosphorus atoms directly bound to carbon atoms in the organic phosphonates to the number of moles of phosphorus atoms in the inorganic phosphates in the same composition is at least 0.16:1.0 and is not more than 0.90:1.0 and said phosphorus atoms in phosphonate anions are present in such an amount that the ratio of the total number of moles of this component to the number of moles of anions in component (A) is within a range from about 0.05:1.0 to about 5:1.0;

(D) at least about 0.10% of non-volatile contents of a component selected from the group consisting of water-soluble and water-dispersible organic polymers and polymer-forming resins, the amount of component (D) also being such that the ratio of the solids content of the organic polymers and polymer-forming resins in the composition to the solids content of component (A) is within the range from about 1:2 to 3:1; and (E) acidity.

17. A method of improving paint adhesion to a predominantly zinciferous metal surface which comprises:

(I) coating the predominantly zinciferous metal surface with a coating of a liquid composition or a diluted solution thereof in water, said composition comprising water and:

(A) at least about 0.010 M/kg to about 0.28 M/kg of a component of fluorometallate anions; each of said anions comprising (i) at least four fluorine atoms, and (ii) at least one atom of an element selected from the group consisting of titanium, zirconium, hafnium, silicon, aluminum, and boron;

(B) a component of cations consisting essentially of zinc in such an amount that the ratio of the total number of cations of this component to the number of anions in component (A) is at least about 1:5 but not greater than about 3:1;

(C.1) at least about 0.015 M/kg of phosphorus atoms in a component selected from the group consisting of pentavalent phosphorus-containing inorganic oxyanions;

(C.2) at least about 0.00 1 M/kg of phosphorus atoms bonded directly to carbon in phosphonate anions, the ratio of the concentration of moles of phosphorus atoms directly bound to carbon atoms in the organic phosphonates to the number of moles of phosphorus atoms in the inorganic phosphates in the same composition being within a range from about 0.16:1.0 to about 0.9:1.0, and said phosphorus atoms directly bound to carbon in phosphonate anions are present in such an amount that the ratio of the total number of moles of phosphorus atoms directly bound to carbon atoms to the number of moles of anions in component (A) is within a range from about 0.05:1.0 to about 5:1.0;

(D) at least about 0.10% of non-volatile contents of a component selected from the group consisting of water-soluble and water-dispersible organic polymers and polymer-forming resins, the amount of component (D) also being such that the ratio of the solids content of the organic polymers and polymer-forming resins in the composition to the solids content of component (A) is within the range from about 1:2 to 3:1; and (E) acidity (II) drying into place on the surface of the metal the coating applied in step (I), without intermediate rinsing; and (III) painting the surface of the metal.

* * * * *